Patented Nov. 28, 1950

2,532,099

UNITED STATES PATENT OFFICE 2,532,099

PAINT MATERIAL

Rowland G. Houser, San Francisco, Calif., assignor to Marite Products, Inc., Grass Valley, Calif., a corporation of California No Drawing. Application July 25, 1949,
Serial No. 106,751

1 Claim. (Cl. 106—106)

This invention relates to the production of a novel fire-proof and weather-proof paint or coating material consisting essentially of calcined magnesite and magnesium chloride intimately intermixed with other ingredients to provide, when mixed with water, a hard setting cementitious coating over any surface which it is desired to make substantially fire-proof and weather-proof.

The principal object of the invention is to provide a mixture of this kind which may be initially provided in intimately intermixed pulverized form so that it may be placed in a container in ready-to-use form and which needs only the addition of water to cause the several ingredients to chemically combine. Ordinarily, in mixtures of the character discussed, the portions containing the calcined magnesite and the portions containing magnesium chloride must be put up and shipped in separate containers since the magnesite and magnesium chloride tend to absorb moisture and to hydrate. Therefore, unless such tendency in a mixture containing the two is inhibited, the chemical reaction between the two will commerce in the containers and the mixture will thereupon tend to harden and be rendered useless.

The following is an example of the preferred form and relative basic materials used in the dry mixture which has been found to produce the best results:

| | | |
|---|---|---|
| Magnesium chloride | pounds | 7½ |
| Calcium chloride | do | 2½ |
| Copper sulphate | ounces | 4 |
| Epsom salts | do | 8 |
| Magnesite (calcined) | pounds | 6 |
| Feldspar | do | 4 |
| Talc | ounces | 4 |

These materials are intimately mixed in dry form and there is then added thereto aluminum ammonium sulphate in the proportion of one ounce to the total amount of the mixture which has been put together in the above proportions. This latter ingredient is then thoroughly sifted and diffused through the balance of the mixture by suitable means. It has been found that the aluminum ammonium sulphate then sufficiently coats the magnesite and magnesium chloride to a degree necessary to substantially inhibit the absorption of atmospheric moisture thereby and hence the entire mixture will be maintained in its dry pulverized state until ready for use. Then, by the mere addition of sufficient water thereto the desired chemical reaction thereof takes place so that when surfaces are painted or coated therewith and the material sets and dries there will remain the desired fire-proofing and weather-proofing of such surface.

By adding less water, the material may be also shaped into artificial stone, tile, mosaics, ornamental figures and the like.

From the foregoing description it will be readily seen that there has been produced such a novel composition of matter as substantially fulfills the objects of the invention as set forth herein.

While this specification sets forth in detail, the present and preferred ingredients of the basic composition of matter used, still in practice such deviations from such detail may be resorted to as do not form a departure from the spirit of the invention, as defined by the appended claims.

Having thus described the invention, the following is claimed as new and useful and upon which Letters Patent is desired:

A mixture for use in making a paint or coating material, such mixture consisting of the following ingredients in the following relative proportions: magnesium chloride, seven and one-half pounds; calcium chloride, two and one-half pounds; copper sulphate, four ounces; Epsom salts, eight ounces; aluminum ammonium sulphate, one ounce; magnesite, six pounds; feldspar, four pounds; talc, four ounces.

ROWLAND G. HOUSER.

REFERENCES CITED

The following references are of record in the file of this patent:

UNITED STATES PATENTS

| Number | Name | Date |
|---|---|---|
| 483,565 | Maardt | Oct. 4, 1892 |
| 535,327 | Gallinowsky | Mar. 5, 1895 |